United States Patent
Gatchalian et al.

(10) Patent No.: US 12,321,986 B2
(45) Date of Patent: *Jun. 3, 2025

(54) BANKING AS A SERVICE ENABLED VIRTUAL EXCHANGE COMPUTING PLATFORM

(71) Applicant: Bank of America Corporation, Charlotte, NC (US)

(72) Inventors: Gilbert M. Gatchalian, Union, NJ (US); Jesse S. Newsom, III, Charlotte, NC (US); Kevin Tran, Plano, TX (US); Yogi Ahuja, Warwick, PA (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,105

(22) Filed: May 16, 2023

(65) Prior Publication Data
US 2023/0306511 A1    Sep. 28, 2023

Related U.S. Application Data

(63) Continuation of application No. 17/401,501, filed on Aug. 13, 2021, now Pat. No. 11,699,188.

(51) Int. Cl.
*G06Q 40/04* (2012.01)
*G06F 16/951* (2019.01)
(Continued)

(52) U.S. Cl.
CPC .......... *G06Q 40/04* (2013.01); *G06F 16/951* (2019.01); *G06Q 20/108* (2013.01); *G06Q 30/0641* (2013.01)

(58) Field of Classification Search
CPC .. G06Q 40/04; G06Q 20/108; G06Q 30/0641; G06F 16/951
(Continued)

(56) References Cited

U.S. PATENT DOCUMENTS 10,026,261 B2    7/2018    Arnone et al.
10,297,105 B2    5/2019    LeMay et al.
(Continued)

OTHER PUBLICATIONS

Nydia Remolina, Open Banking: Regulatory challenges for a new form of financial intermediation in a data-driven world, 2019, Singapore Management University, pp. 1-58.

*Primary Examiner* — Robert R Niquette
(74) *Attorney, Agent, or Firm* — Banner & Witcoff, Ltd.

(57) ABSTRACT

A computing system includes a first computing platform and a virtual exchange computing platform, where the first computing platform provides an application and a first electronic value token and the virtual exchange computing platform is communicatively coupled to the first computing platform. The virtual exchange computing platform receives the information corresponding to the first electronic value token and calculates, via API functions linking to banking as a service (BaaS) functionality processed by a valuation computing platform, a valuation of the first electronic value token. The virtual exchange computing platform causes presentation, via a network and on a first user device, a user interface screen presenting a visualization of a value of the electronic value token and comprising an input and triggers, based on a received trade input from the user interface, a virtual exchange of value involving the first electronic value token.

20 Claims, 3 Drawing Sheets

(51) Int. Cl.
*G06Q 20/10* (2012.01)
*G06Q 30/06* (2023.01)
*G06Q 30/0601* (2023.01)

(58) Field of Classification Search
USPC .................................................. 705/35–45
See application file for complete search history.

(56) References Cited

U.S. PATENT DOCUMENTS

| | | |
|---|---|---|
| 11,011,020 B2 | 5/2021 | Springer |
| 2008/0270264 A1 | 10/2008 | Bissett et al. |
| 2013/0036048 A1* | 2/2013 | Campos ................. G06Q 20/40 |
| | | 705/41 |
| 2013/0304642 A1* | 11/2013 | Campos ............. G06Q 20/3572 |
| | | 705/41 |
| 2014/0164251 A1 | 6/2014 | Loh |
| 2014/0195425 A1* | 7/2014 | Campos ............. G06Q 20/4018 |
| | | 705/41 |
| 2014/0344149 A1* | 11/2014 | Campos ............. G06Q 20/3674 |
| | | 705/41 |
| 2018/0033248 A1 | 2/2018 | LeMay et al. |
| 2018/0040195 A1 | 2/2018 | Moro |
| 2018/0089944 A1 | 3/2018 | Upton et al. |
| 2018/0285863 A1 | 10/2018 | Loh |
| 2019/0012878 A1 | 1/2019 | Moro |
| 2019/0287339 A1 | 9/2019 | Oberberger |
| 2020/0168030 A1 | 5/2020 | Kubajak et al. |
| 2023/0281618 A1* | 9/2023 | Cella .................... G06Q 20/123 |
| | | 705/44 |
| 2023/0306511 A1* | 9/2023 | Gatchalian ............. G06Q 40/04 |

\* cited by examiner

BANKING AS A SERVICE ENABLED VIRTUAL EXCHANGE COMPUTING PLATFORM

CROSS REFERENCE TO RELATED APPLICATION(S)

This application is a continuation of and claims priority to U.S. patent application Ser. No. 17/401,501 entitled "Banking as a Service Enabled Virtual Exchange Computing Platform" filed on Aug. 13, 2021, which is incorporated by reference in its entirety.

BACKGROUND

Enterprise organizations may utilize various computing infrastructure to transact business with their customers. In some instances, the enterprise organizations may allow users to perform in-application electronic transactions electronic value objects that, for example, may correspond to real or virtual currencies. In some cases, enterprise organizations may reward customers and users with non-monetary rewards in a form of an electronic value object having a value relative to a particular functionality provided by the enterprise organization though their normal business operations (e.g., rewards points, travel mileage value, and the like). Presently, enterprise organizations provide limited opportunities to use these electronic value objects and as such, many electronic value objects remain unused and may be abandoned.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with providing an online virtual exchange for electronic value objects where the virtual exchange use Banking as a Service (BaaS) concepts to integrate banking functions to enable the virtual exchange functionality. In particular, one or more aspects of the disclosure relate to BaaS functionality may be integrated into application programming interfaces (APIs) to attach a banking back end to online virtual exchange platform front ends to facilitate digital exchange of electronic value objects.

Aspects of the disclosure relate to hosting an online exchange for virtual currencies and using Bank as a Service (BaaS) concepts to integrate current banking functions with an online virtual exchange to facilitate exchange of electronic value objects. For example, electronic value objects may include virtual currencies that may be used for micro-transactions. The BaaS functionality may be used to provide a service that integrates with one or more virtual currencies, or other electronic value objects, to monetize applications. For example, a BaaS service may be provided to exchange currencies between any platform. In some cases, demand exists for attaching a banking back end functionality to multiple platform front ends to facilitate exchange of electronic value objects. In some cases, BaaS services provided by an enterprise organization may be used to process electronic transactions surrounding different formats of electronic value objects and may be used to convert them to real money for the companies providing the platforms, such as by providing a method for users to convert value earned or created in a first platform (e.g., a virtual computing environment, an entertainment application environment) into electronic value objects of a second platform (e.g., a commercial application, a rewards application and the like). Within a micro-transaction space of a particular platform, electronic value objects may be traded with multipliers to different factions within a platform. In some cases, the BaaS functionality may facilitate creation of an electronic gift card component, where real currency and/or electronic value objects may be moved into and/or out of different platforms.

In some cases, users or customers may desire to transact and/or view electronic value objects in terms of one or more real currency values instead of, for example, virtual currency values. A BaaS enabled wallet or vault may be created and provided via an online interface so that the user may keep electronic value objects (e.g., rewards points, virtual currency, and the like) and real currency to see values and exchange between the two values. In some cases, the BaaS functionality may include value exchange functions that may also account for different platforms having different popularity levels so that, for example, electronic value objects may be exchanged between different platforms. In some cases, the BaaS functionality may include functions that may be used to enable an educational component and may be used, for example, to teach young adults about investing, using their virtual currency.

Aspects of the disclosure relate to a computing system including a first computing platform and a virtual exchange computing platform, where the first computing platform provides an application and a first electronic value token and the virtual exchange computing platform is communicatively coupled to the first computing platform. The virtual exchange computing platform may receive, via a network, the information corresponding to the first electronic value token and calculate, via API functions linking to banking as a service (BaaS) functionality processed by a valuation computing platform, a valuation of the first electronic value token. In some cases, the virtual exchange computing platform may cause presentation, via a network and on a first user device, a user interface screen presenting a visualization of a value of the electronic value token and comprising an input and may trigger, based on a received trade input from the user interface, a virtual exchange of value involving the first electronic value token.

Aspects of the disclosure may relate to a crawler engine and wherein the instructions further cause the crawler engine of the virtual exchange computing platform to aggregate information corresponding to the first electronic value token from a plurality of online sources. In some cases, the plurality of online sources comprises one or more of a news website and a social media website. Aspects of the disclosure may relate to visualizations of virtual electronic token exchanges and/or virtual marketplaces, such as, for example, a user interface display of information of a user account comprising at least a quantity of the first electronic value token. In some cases, the visualization may include a user interface display of an in-application virtual marketplace. Aspects of the disclosure may relate to exchange of virtual electronic tokens between different user computing devices. For example, the first user device and a second user device may communicate with the virtual exchange computing platform to facilitate an exchange of a quantity of first electronic tokens and a second quantity of second electronic tokens. In some cases, the first electronic value token comprises an in-application virtual currency and the second electronic value token comprises a mileage reward point.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a BaaS enabled virtual exchange computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

In some cases, users of online applications may be allowed, or be incentivized, to use an application or online virtual platform through use of virtual currencies or other electronic value tokens. In an illustrative example, an online virtual platform, such as an online entertainment application platform, may utilize virtual currency or other electronic value tokens to reward users for performing actions and/or to purchase virtual items to use within the virtual environment. In some cases, the users may be allowed to purchase, using real currencies, a number of electronic value tokens to purchase virtual items to use within the virtual environment and/or to upgrade a user experience. Electronic value tokens are not limited to use within virtual environments, but may also include electronic rewards, such as rewards points for staying in hotels or renting vehicles, mileage rewards for flying on airplanes, a count of purchases of certain products from various retailers, electronic stars for purchasing food or beverages and/or the like. Typically, such electronic value tokens are limited to use within a particular environment or with a certain organization or organizations. While some types of electronic token exchange may be possible in limited circumstances, much of these electronic value tokens are illiquid and remain unused and causing a loss of value to both a consumer and a loss of good will towards the retailer. As such, a need has been recognized for a foreign exchange-type of virtual exchange for electronic value tokens capable of providing a consistent and accepted valuation for each type of electronic value token, while supplying a secure and regulated exchange environment. By leveraging BaaS functionality, well regulated and secure banking functionality and services may be applied to this virtual exchange environment.

Within the virtual exchange environment, a verified user may exchange any electronic value token (e.g., a cryptocurrency, virtual currency, real currency, rewards points, airline miles, hotel stay points, electronic tokens, rewards stars, electronic coins, electronic gems, electronic casino chips, experience points, a time increment, and/or the like.) or other similar electronic indication of value to obtain virtual (or real) goods and services. In an illustrative example, a virtual environment such as a virtual entertainment application environment, may allow a user to import real currency into electronic value tokens to allow the user to make in-application purchases, receive hints or purchase an upgrade to the virtual experience. In other cases, the virtual environment may reward users for work performed while online within the virtual environment, where the earned electronic value tokens may be used to purchase real or virtual goods or services. Similarly, organizations may reward consumers for real-world use of a service and/or purchase of a product with electronic value tokens, such as rewards points that may be redeemed, usually at a same retailer or service provider at which they were earned, for particular products or services, such as an airline trip, a cup of coffee, or the like.

An electronic virtual exchange may be used to allow users to freely exchange electronic value tokens in a well-regulated and trusted environment. The electronic virtual exchange may determine a value for each exchanged electronic value token, such as by using methods similar to those used for valuation of real currencies. For example, an electronic value token from a first provider may be given an initial value upon entry into the virtual exchange environment. An electronic value token from a large or established organization (e.g., a large corporation with an established customer base and long standing known and used electronic value token reward such as an airline and their mileage reward points or the like) may be given a higher initial valuation than an electronic token provided within an application of a newly established small mobile application developer. Similarly to real currency valuations, electronic value tokens valuations may change over time as triggered by a variety of events such as an economic viability of the providing organization, receipt of additional funding to a small developer, popularity changes of an application or service, positive or negative news events or social media posts affecting a perception of the product, service or the underlying organization, and/or the like. In some cases, the electronic value token may be "pegged" relative to another electronic value token or a real currency, where the value of the pegged electronic value token may vary, such as based on a variable multiplier and based on the valuation of the underlying electronic value token or real currency.

In some cases, the virtual exchange environment may include a module (e.g., a web crawler) to identify news and/or electronic information relevant to valuation of electronic value tokens available in the virtual exchange environment, such as news articles, social media posts, advertisements, media mentions, and/or the like. In some cases, the electronic value exchange may include a valuation module that may analyze aggregated information obtained from the internet, or other sources, such as by the crawler. In some cases, the valuation module may utilize BaaS functions to perform valuation functions similar to those performed for a real currency foreign exchange environment. In some cases, electronic value tokens may be assigned a value by an artificial intelligence enabled valuation module. Because electronic value tokens are often not backed by a commodity (e.g., gold, silver, oil, or the like), the electronic value tokens often lack intrinsic value similar to cryptocurrencies. Like cryptocurrencies, valuations of electronic value tokens may vary based on a supply of and a demand for the particular electronic value token, among other factors such as a user's trust that the electronic value token will remain viable over a period of time. The artificial intelligence engine may process one or more supervised or unsupervised algorithms that may evaluate each electronic value token and may consider a risk associated with the electronic value token losing value. In many cases, a financial organization may provide access to valuation functionality via BaaS functions that may then be used by the virtual exchange environment to provide a trusted and consistent valuation model for the electronic value tokens being exchanged in the virtual exchange environment.

In some cases, the BaaS functionality may be performed based on banking regulations relevant to particular electronic tokens to increase users' trust of the virtual exchange environment. Similar to a real foreign exchange market, the virtual exchange environment may be decentralized due to the open nature of the online experience. For currency foreign exchange environments, various countries have watchdog groups (e.g., the National Futures Association and the Commodity Futures Trading Commission in the US, the Australian Securities and Investments Commission in Australia, and the Financial Conduct Authority in the UK, and the like) that provide licenses to organizations that comply with local regulations. Such regulations may be incorporated into processes and functions used in back end computing environments of financial organizations. As such, these functions that comply with local regulations may be leveraged and used via one or more BaaS functions to enable the virtual exchange environment to provide a well regulated and trusted environment in which to perform an exchange of electronic value tokens. Such functions may provide a reliable and immutable record of operations of the electronic exchange environment. For example, the electronic value exchange may leverage blockchain technology to create an immutable record of trades that allow for recurrent audits, reviews and checks to ensure the electronic value exchange meets all regulatory requirements of particular jurisdictions.

In some cases, a financial institution and/or a banking institution may expose BaaS functionality for use by application developers and/or other services providers such as by providing an application programming interface and/or a software development kit. In some cases, API functionality may be integrated into applications or other software-based platforms that provide electronic value objects, such as virtual currency, real currency, digital currency (e.g., Bitcoin and the like), rewards points, mileage totals, stay counts, and the like. In some cases, a virtual exchange computing platform may be configured to capture information corresponding to enterprise organizations and/or their provided electronic value objects, such as by utilizing a web crawler application to obtain such information such as popularity information, perceived value information, economic/commercial strength information corresponding to an organization, installed base information, current exchange information, information corresponding to methods to earn/create or use electronic value objects and the like. In some cases, the virtual exchange computing platform may calculate a value associated with one or more electronic value objects, such as by utilizing an artificial intelligence model and utilizing various functionalities exposed via the BaaS interface. The virtual exchange computing platform may facilitate exchange of electronic value objects via a virtual exchange accessible to individuals that own, or would like to own, one or more of the electronic value objects traded via the virtual exchange. In some cases, the BaaS functionality may be used to power a virtual marketplace, such as within a virtual online environment and/or within an application, which may allow purchases or trades of one or more electronic value objects and/or may allow virtual banking activities within the application to facilitate virtual economy within a particular platform. In some cases, the BaaS functionality may facilitate regulartory controls put in place for relevant jurisdictions based on, for example, a country of origin of the user. In some cases, the BaaS functionality may be used to facilitate one or more online financial education opportunities, such as an educational stock exchange application that may mimic a real stock exchange operation but may operate using electronic value tokens. In some cases, at least a portion of the electronic value objects earned via the educational exchange may also be traded via the virtual exchange for other electronic value objects.

Figure 1A:
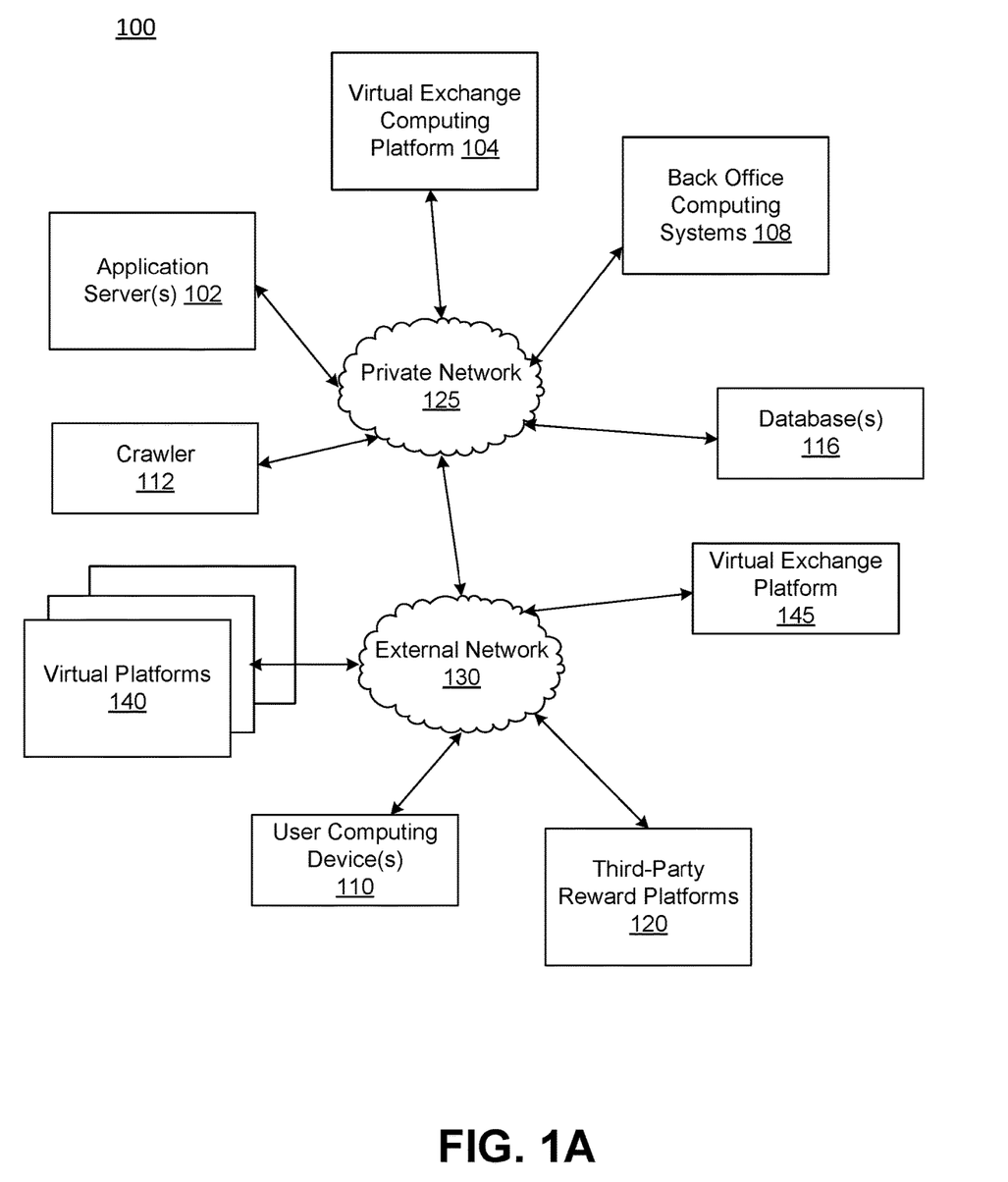
FIG. 1A shows an illustrative computing environment providing a virtual exchange environment for electronic value tokens, in accordance with one or more aspects described herein.

FIG. 1A shows an illustrative computing environment 100 for providing a virtual exchange environment to allow exchange of electronic value tokens between online and real-world environments, in accordance with one or more arrangements. The computing environment 100 may comprise one or more devices (e.g., computer systems, communication devices, and the like). The computing environment 100 may comprise, for example, one or more application server(s) 102, a virtual exchange computing platform 104, one or more back office computing systems 108, a crawler system 112, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise one or more third party computing systems 120, one or more user devices 110, one or more virtual platforms 140, one or more virtual exchange platforms 145 connected, via a public or external network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3rd Generation Partnership Project (3GPP) cellular protocol, a hypertext transfer protocol (HTTP), etc.).

The virtual exchange computing platform 104 may comprise one or more computing devices and/or other computer components (e.g., processors, memories, communication interfaces) configured to perform one or more functions as described herein. Further details associated with the architecture of the virtual exchange computing platform 104 are described with reference to FIG. 1B.

The application servers 102 may comprise one or more computing devices and/or other computer components (e.g., processors, memories, communication interfaces). In addition, the application servers 102 may be configured to host, execute, and/or otherwise provide one or more enterprise applications. In an arrangement where the private network 125 is associated with a financial institution (e.g., a bank), the application servers 102 may be configured, for example, to host, execute, and/or otherwise provide one or more transaction processing programs, such as an online banking application, fund transfer applications, valuation applications, exchange applications, and/or other programs associated with the financial institution. The application servers 102 may comprise various servers and/or databases that store and/or otherwise maintain account information, such as financial account information including account balances, transaction history, account owner information, and/or other information. In addition, the application servers 102 may process and/or otherwise execute transactions on specific accounts based on commands and/or other information received from other computer systems comprising the computing environment 100. In some cases, the enterprise application host platform may be configured, for example, to host, execute, and/or otherwise provide one or more transaction processing programs, such as electronic fund transfer applications, online loan processing applications, and/or other programs associated with the financial institution.

The back-office computing systems 108 may include one or more host devices (e.g., a workstation, a server, and the like) or mobile computing device (e.g., smartphone, tablet). In addition, an administrative computing device may be linked to and/or operated by a specific enterprise user (who may, for example, be an employee or other affiliate of the enterprise organization) who may have administrative privileges to perform various operations within the private network 125. In some cases, the back-office computing systems may include a user authentication system that may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights. For example, an application may require a passcode or facial recognition for login purposes and may require voice recognition and/or may verify a location of access, a time of day of access and/or may rely on learned patterns of activity of the associated user to allow access to a second functionality.

The crawler 112 may include one or more host devices configured to crawl or otherwise monitor information publicly available within an online environment, such as the internet. The crawler may gather and aggregate information to facilitate valuation processes for electronic value tokens by, for example, aggregating information mentioning industries, companies, and providers of electronic value tokens, social media posts mentioning products, services, electronic value tokens, company names and/or the like. The crawler 112 may store the aggregated information in the databases 116 for use by the virtual exchange computing platform 104, such as to compute a value of an electronic value token, to make a determination to allow or discontinue exchange of a particular electronic value token within the virtual exchange environment and the like.

The third party computing system 120 may comprise one or more computing devices and/or other computer components (e.g., processors, memories, communication interfaces). The third-party computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the third-party computing system 120 is for processing an electronic exchange of goods and/or services. The third-party computing system 120 may be associated with a specific goods purchasing activity, such as purchasing a vehicle, transferring title of real estate may perform communicate with one or more other platforms within the third-party computing system 120.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the virtual assistant factory platform 104. For example, the database(s) 116 may store a listing of accounts that may be potentially associated with compliance issues (e.g., accounts associated with geographical areas that are not serviced by the financial institution, accounts subject to sanctions by a regulatory authority, etc.). In an arrangement, the database(s) 116 may be used for other purposes as described herein.

In one or more arrangements, the virtual exchange computing platform 104, the application servers 102, the back-office computing systems 108, the crawler 112, the third-party computing system 120, the user devices 110, the virtual platforms, the virtual exchange platform, and/or the other devices/systems in the computing environment 100 may be any type of computing device capable of receiving input via a user interface, and communicating the received input to one or more other computing devices in the computing environment 100. For example, the virtual exchange computing platform 104, the application servers 102, the back-office computing systems 108, the crawler 112, the third-party computing system 120, the user devices 110, the virtual platforms, the virtual exchange platform, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the virtual exchange computing platform 104, the application servers 102, the back-office computing systems 108, the crawler 112, the third-party computing system 120, the user devices 110, the virtual platforms, the virtual exchange platform, and/or the other devices/systems in the computing environment 100 may, in some instances, be and/or comprise special-purpose computing devices configured to perform specific functions.

Figure 1B:
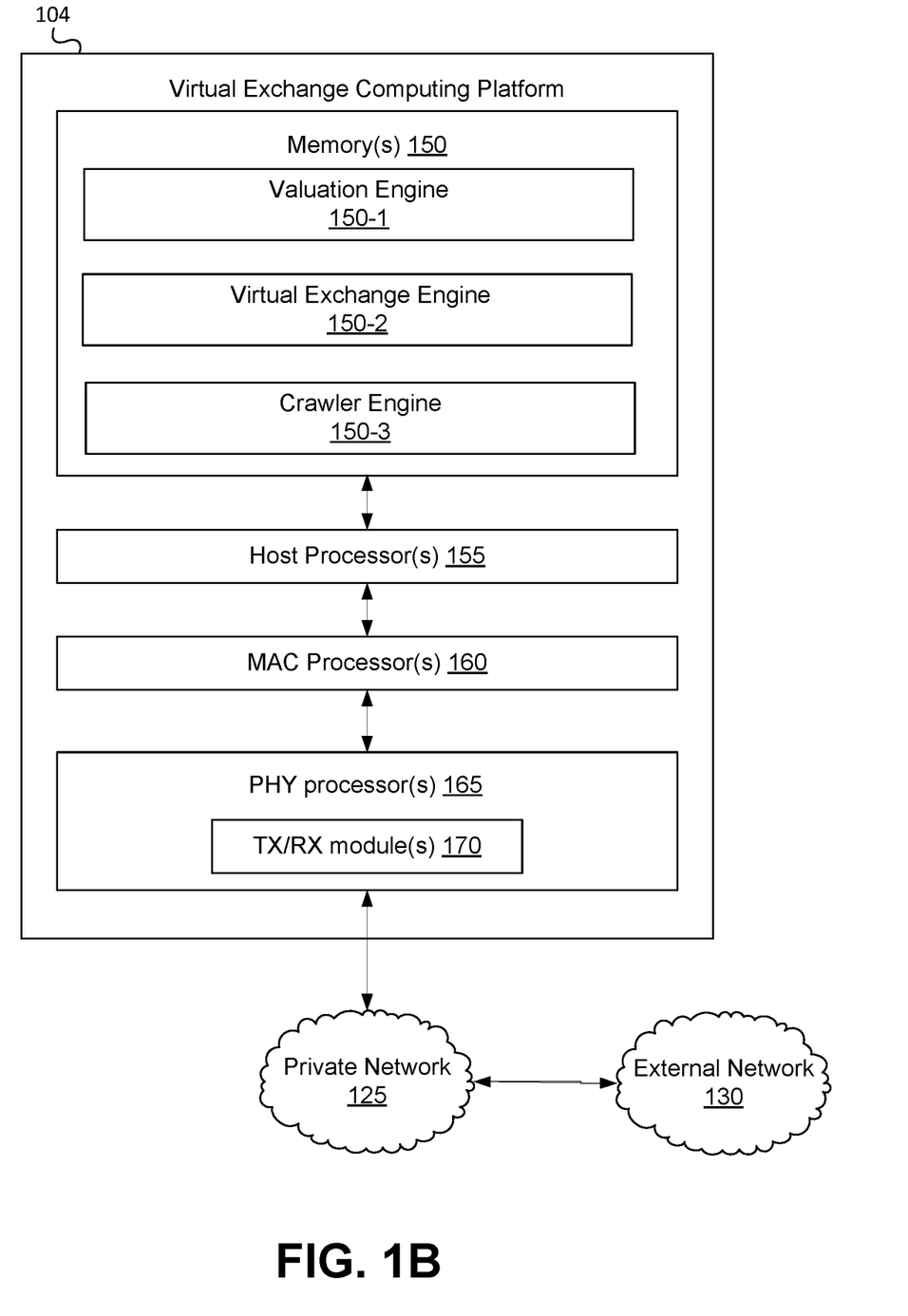
FIG. 1B shows an illustrative computing platform enabled for providing a virtual exchange environment for electronic value tokens, in accordance with one or more aspects described herein.

FIG. 1B shows an illustrative virtual exchange computing platform 104 in accordance with one or more examples described herein. The virtual exchange computing platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The virtual assistant factory platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the virtual assistant factory platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the check generation service platform 104 may be configured to execute machine readable instructions stored in memory 150. The memory 150 may comprise (i) one or more program modules/engines having instructions that when executed by the one or more processors cause the check generation service platform 104 to perform one or more functions described herein and/or (ii) one or more databases that may store and/or otherwise maintain information which may be used by the one or more program modules/engines and/or the one or more processors. The one or more program modules/engines For example, the memory 150 may have, store, and/or comprise a valuation engine 150-1, a virtual exchange engine 150-2, and/or a crawler engine 150-3. The valuation engine 150-1 may have instructions that utilize BaaS functionality and/or artificial intelligence algorithms to cause the virtual exchange computing platform 104 to perform one or more operations associated with calculating or otherwise determining a valuation of each electronic value token being exchanged or considered for exchange via the virtual exchange environment. The virtual exchange engine 150-2 may have instructions that may use BaaS functionality that may cause the virtual exchange computing platform 104 to perform functions to allow secure and trusted cross-platform exchange of electronic value tokens. The crawler engine 150-3 may aggregate information related to and/or corresponding to electronic value tokens or electronic value token providers by aggregating information obtained via a networked environment, such as the internet.

While FIG. 1A illustrates the virtual exchange computing platform 104, the application servers 102, the back-office computing systems 108, and the crawler 112 as being separate elements connected in the private network 125, in one or more other arrangements, functions of one or more of the above may be integrated in a single device/network of devices. For example, elements in the virtual exchange computing platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, application servers 102, the back-office computing systems 108, and the crawler 112.

Figure 2:
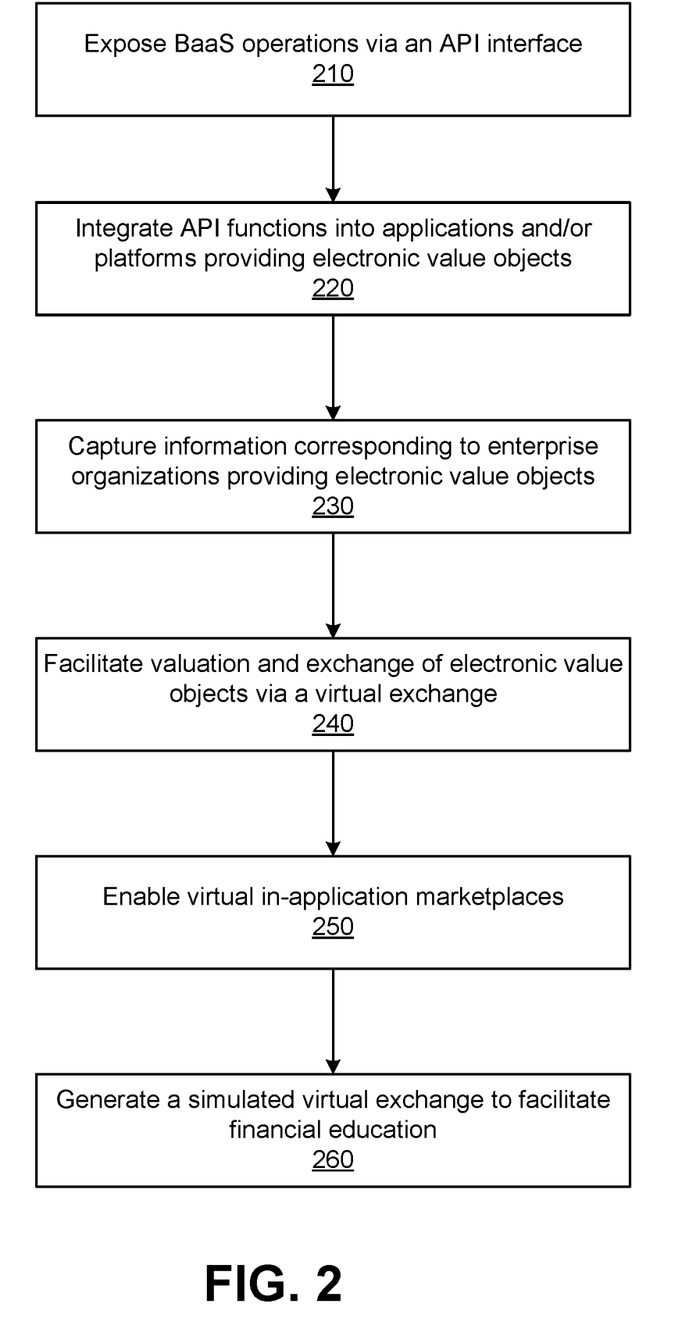
FIG. 2 shows an illustrative event sequences providing a virtual exchange environment for electronic value tokens, in accordance with one or more example arrangements.

FIG. 2 shows an illustrative event sequences providing a virtual exchange environment for electronic value tokens, in accordance with one or more example arrangements. For example, at 210, a financial institution such as a bank may provide external access to banking functionality via BaaS services or operations via an application programming interface (API). The API may allow programmers to access trusted and regulated functionality used by the financial institution and that complies with local and/or international regulatory requirements, such as for providing exchange of currencies. Such functionality may be leveraged when valuating and/or exchanging electronic value tokens. At 220, an organization (e.g., the financial institution and/or external organizations or developers) may incorporate the API function calls into an existing application or as a stand-alone virtual exchange environment to allow for exchange of virtual electronic tokens and, in some cases, additionally for real currency exchange. The API functions may allow application developers to provide an in-world or in-environment virtual marketplace where users may exchange electronic value tokens between platforms while remaining within the virtual environment. In some cases, the virtual exchange environment incorporating the API BaaS functionality may be a stand-alone virtual environment accessible via the internet, for example. In some cases, the BaaS functionality may leverage existing user authentication functionality, user account creation and/or management functionality, valuation functionality, exchange functionality, record keeping functionality blockchain interface technology and/or the like.

At 230, the crawler 112 may capture information corresponding to organizations providing electronic value tokens, such as by crawling internet websites, social media sites and/or the like. In some cases the crawler 112 may aggregate captured information related to a service provider, an organization, a product, a service, an electronic value token and the like. In some cases, the captured information may be associated with a reputation, trustworthiness, a perceived value of a product or service and/or electronic value token, and/or the like.

At 240, the virtual exchange computing platform 104 may calculate a valuation of an electronic value token based on, at least in part, the aggregated information obtained from the crawler 112, an initial valuation, a current valuation, an available supply of the electronic value token, a demand for the electronic value token and the like. In some cases, the valuation functionality may leverage BaaS valuation services, including AI algorithm driven valuation functionality, provide through the API functions. With each electronic value token having a valuation assigned, the virtual exchange may allow for directed or open trading or exchange of electronic value tokens based on a valuation and utilizing BaaS trading functionality provided via the API functions. In addition, the virtual exchange computing platform 104 may allow users to create accounts holding different types of electronic value tokens and/or may offer user interfaces through applications or interfaces (e.g., a banking application or website). The user management functionality may be leveraged from BaaS user management and/or account management functionality provided via the API interface. Additional functionality provided by the virtual exchange computing platform may include tracking of historical valuations of different electronic value tokens, comparisons between different electronic value tokens and/or the like and may leverage BaaS functionality provided via the API interface. At 250, the virtual exchange computing platform 140 may allow integration of virtual exchange functionality via API functions so that application developers may integrate BaaS enabled virtual financial operations directly into a virtual platform or online service, application or the like. For example, a virtual electronic community may allow users to earn electronic value tokens via performance of in-application activities. For example, a virtual avatar of an individual may earn electronic value tokens after performance of specified in-world activities. Such electronic value tokens may typically be used in-world for upgrades, purchases and/or the like within the virtual environment. By incorporating the API functions that leverage BaaS enabled virtual exchange functionality, virtual communities and/or other applications provided by third-parties may leverage BaaS functionality to enable virtual banking, electronic token account management, and/or trading activities for electronic value tokens, both for in-world electronic value tokens and electronic value tokens from other applications or online environments. Here, application developers and/or organizations may provide safe, secure, and regulated trading environment for electronic value tokens. Similarly, educational institutions may leverage virtual exchange API functions to enable educational tools that allow life-like trading opportunities to allow individuals to learn about trading and/or exchange of currencies without risk to their real world currency ownership.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. An apparatus comprising:
  at least one first processor; and
  first memory storing computer-readable instructions that, when executed by the at least one first processor, cause the apparatus to:
    receive, from a first user device, first inputs to an application causing actions within a virtual community, wherein the actions are performed by an avatar within the virtual community within a virtualized environment;
    create, based on the actions of the avatar within the virtual community and via performance of specified in-world activities performed within the virtualized environment, a first electronic value token comprising a virtual currency unique to the virtual community, wherein the actions are performed via the first inputs to the application;
    store, in a banking as a service (BaaS) enabled wallet via an online interface the first electronic value token;
    receive, via a network, information corresponding to the first electronic value token, wherein the information comprises one or more of reputation, trustworthiness, and a perceived value of a product and/or service;
    calculate, via a first application programming interface (API) function linking to BaaS functionality processed by a valuation computing platform and based on the information corresponding to the first electronic value token, a valuation of the first electronic value token; and
    trigger, based on a received trade input from a user interface and via a second API function facilitating BaaS functionality and based on the valuation of the first electronic value token, creation of a second electronic value token via a virtual exchange of value involving the first electronic value token within a virtualized trading environment of the virtual community and between the BaaS enabled wallet and a second user account corresponding to a second BaaS enabled wallet associated with a second user device, wherein the virtual exchange of value comprises an exchange of the first electronic value token associated with the virtual environment and from the BaaS enabled wallet to the created second electronic value token associated with a second computing platform external to the virtual environment, and wherein the second electronic value token comprises a value useable outside the virtual community.

2. The apparatus of claim 1, further comprising a crawler engine and wherein the instructions further cause the crawler engine of the virtual community to aggregate information corresponding to the first electronic value token from a plurality of online sources.

3. The apparatus of claim 2, wherein the plurality of online sources comprises one or more of a news website and a social media website.

4. The apparatus of claim 1, wherein a visualization comprises a user interface display of information of a user account comprising at least a quantity of the first electronic value token.

5. The apparatus of claim 1, wherein a visualization comprises a user interface display of an in-application virtual marketplace.

6. The apparatus of claim 1, further comprising an interface to a first user device and a second user device; and wherein the instructions further cause the virtual community to facilitate an exchange of a quantity of first electronic tokens and a second quantity of second electronic tokens.

7. The apparatus of claim 6, wherein the first electronic value token comprises an in-application virtual currency and a second electronic value token comprises a mileage reward point.

8. A method comprising:
  receiving, from a first user device, first inputs to an application causing actions within a virtual community, wherein the actions are performed by an avatar within the virtual community within a virtualized environment;
  creating, via the actions performed by the avatar within the virtual community, a first electronic value token comprising virtual value usable within the virtual community, wherein the first electronic value token corresponds to the avatar's performance of specified in-world activities within the virtualized environment via the application, wherein use of the first electronic value token is unique to the virtual community;
  storing, in a banking as a service (BaaS) enabled wallet external to the virtual community via an online interface, the first electronic value token;
  receiving, automatically from a crawler and via a network, information corresponding to the first electronic value token, wherein the information comprises one or more of reputation, trustworthiness, and a perceived value of a product and/or service;
  calculating, via a first application programming interface (API) function linking to BaaS functionality processed by a valuation computing platform and based on the information corresponding to the first electronic value token, a valuation of the first electronic value token; and
  triggering, based on a received trade input from a user interface and the valuation of the first electronic value token, a virtual exchange of value involving the first electronic value token within a virtualized trading environment of the virtual exchange computing platform and from the first electronic value token in a first user account associated with a first user device and to a second electronic value token in a second user account associated with a second user device, wherein the virtual exchange of value comprises a second API function facilitating Baas functionality exchanging the virtual value of the first electronic value token usable within the virtual community to a real value of the second electronic value token usable outside the virtual community.

9. The method of claim 8, further comprising aggregating, by a crawler engine, information corresponding to the first electronic value token from a plurality of online sources.

10. The method of claim 9, wherein the plurality of online sources comprises one or more of a news website and a social media website.

11. The method of claim 8, comprising, causing presentation, at a remote device, of a visualization comprising a user interface display of information of a user account comprising at least a quantity of the first electronic value token.

12. The method of claim 8, comprising, causing presentation, at a remote device, of a visualization comprising a user interface display of an in-application virtual marketplace.

13. The method of claim 8, facilitating, by a virtual exchange engine, an exchange of a quantity of first electronic tokens from the first user device and a second quantity of second electronic tokens of a second user device.

14. The method of claim 13, wherein the first electronic value token comprises an in-application virtual currency and a second electronic value token comprises a mileage reward point.

15. A system comprising:
a first user device comprising a user interface communicatively coupled to a virtual community, the first user device comprising a first processor and first memory storing first instructions that, when executed by the first processor, cause the first user device to receive, via the user interface, user inputs in response to a presentation of an avatar within the virtual community;
a first computing platform providing an application corresponding to the virtual community, the first computing platform comprising a second processor and second memory storing instructions that, when executed by the second processor, cause the first computing platform to cause the avatar to perform actions within the virtual community based on the user inputs;
a virtual exchange computing platform communicatively coupled to the first computing platform, comprising:
at least one first processor; and
first memory storing computer-readable instructions that, when executed by the at least one first processor, cause the virtual exchange computing platform to:

receive, from the first computing platform, information corresponding to the actions within the virtual community performed by the avatar;
generate, based on the actions of the avatar within the virtual community and via performance of specified in-world virtualized activities, a first electronic value token comprising virtual value usable within the virtual community;
store, in a banking as a service (BaaS) enabled wallet external to the virtual community via an online interface the first electronic value token;
receive, via a network, information corresponding to the first electronic value token, wherein the information comprises one or more of reputation, trustworthiness, and a perceived value of a product and/or service;
calculate, via a first application programming interface (API) function linking to BaaS functionality processed by a valuation computing platform and based on the information corresponding to the first electronic value token, a valuation of the first electronic value token; and
trigger, based on a received trade input from the user interface and via a second API function facilitating BaaS functionality, a virtual exchange of value involving the virtual value of the first electronic value token within a virtualized trading environment and between the BaaS enabled wallet and a second electronic value token comprising real value usable outside the virtual community and stored in a second user account associated with a second user device.

16. The system of claim 15, further comprising a crawler engine and wherein the instructions further cause the crawler engine of the virtual exchange computing platform to aggregate information corresponding to the first electronic value token from a plurality of online sources.

17. The system of claim 15, wherein a visualization comprises a user interface display of information of a user account comprising at least a quantity of the first electronic value token.

18. The system of claim 15, wherein a visualization comprises a user interface display of an in-application virtual marketplace.

19. The system of claim 15, further comprising the first user device and a second user device; and wherein the instructions further cause the virtual exchange computing platform to facilitate an exchange of a quantity of first electronic tokens and a second quantity of second electronic tokens.

20. The system of claim 19, wherein the first electronic value token comprises an in-application virtual currency and a second electronic value token comprises a mileage reward point.

\* \* \* \* \*